US012255805B2

(12) United States Patent
Karia et al.

(10) Patent No.: US 12,255,805 B2
(45) Date of Patent: Mar. 18, 2025

(54) ROUTING PREFERENCE BASED COMMUNICATION TO A CLOSED GROUP HIERARCHY

(71) Applicant: INTERNATIONAL BUSINESS MACHINES CORPORATION, Armonk, NY (US)

(72) Inventors: Jignesh K Karia, Thane (IN); Mukundan Sundararajan, Bangalore (IN); Shilpa Shetty, Bangalore (IN); Pankaj Satyanarayan Dayama, Bangalore (IN); Neha Shah, Kolkata (IN); Vishal Awal, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 17/656,953

(22) Filed: Mar. 29, 2022

(65) Prior Publication Data
US 2023/0318962 A1    Oct. 5, 2023

(51) Int. Cl.
*H04L 45/02* (2022.01)
*H04L 45/00* (2022.01)

(52) U.S. Cl.
CPC ............ *H04L 45/04* (2013.01); *H04L 45/02* (2013.01); *H04L 45/46* (2013.01)

(58) Field of Classification Search
CPC .......... H04L 45/02; H04L 45/04; H04L 45/46
See application file for complete search history.

(56) References Cited

U.S. PATENT DOCUMENTS 6,154,463 A * 11/2000 Aggarwal ............. H04L 12/185
                                                      370/408
9,729,916 B2 * 8/2017 Sheehan ........... H04N 21/25883
9,953,346 B2 * 4/2018 Mangalvedkar ... G06Q 30/0269
(Continued)

FOREIGN PATENT DOCUMENTS

JP    2017150281 A  *  8/2017

OTHER PUBLICATIONS

Agrawal, "Method and System for Showing Targeted Advertisements in a Smart Television during Broadcasting of a Regular Television Channel," IP.com Prior Art Database Technical Disclosure, IP.com No. IPCOM000216764D, Apr. 18, 2012, 3 pgs.
(Continued)

*Primary Examiner* — Phirin Sam
*Assistant Examiner* — David Zhijun Sun
(74) *Attorney, Agent, or Firm* — Caleb D. Wilkes

(57) ABSTRACT

A method, computer system, and a computer program product for message directing are provided. A first computer receives a registration of members organized into a first closed group hierarchy. The first computer receives a notification of a sensed change of an element in an environment of the first closed group hierarchy. The first computer receives a first message from an external device. The first message relates to the changed element. The first computer selects a first member of the first closed group hierarchy for receipt of the first message. The selecting is based on message routing guidelines established for the first closed group hierarchy. In response to receiving the notification of the sensed change, the first computer transmits the first message to the selected first member of the first closed group hierarchy.

20 Claims, 8 Drawing Sheets

(56) References Cited

U.S. PATENT DOCUMENTS

| | | | |
|---|---|---|---|
| 2002/0032035 A1 | 3/2002 | Teshima | |
| 2002/0120502 A1* | 8/2002 | Sakaguchi | H04L 67/535 |
| | | | 705/14.49 |
| 2012/0221406 A1 | 8/2012 | Kruhoeffer | |
| 2016/0148269 A1 | 5/2016 | Lamont | |
| 2016/0253710 A1 | 9/2016 | Publicover | |
| 2020/0389435 A1* | 12/2020 | Coffing | H04L 9/0637 |
| 2022/0067642 A1* | 3/2022 | Barton | G06Q 30/0617 |

OTHER PUBLICATIONS

Amazon, "Dash Smart Shelf Auto-Replenishment Scale for Home and Business," Amazon.com, 9 pgs., [accessed Jan. 17, 2022], Retrieved from the Internet: <https://www.amazon.com/Dash-Smart-Shelf/dp/B07RV6X8LZ>.

Klubnikin, "Automated Replenishment Solutions: Where Smart Home Meets eCommerce," DATAFLOQ.com, 10 pgs., Jan. 28, 2019, [accessed Jan. 17, 2022], Retrieved from the Internet: <https://datafloq.com/read/automated-replenishment-solutions-smart-homes/5993>.

Mell et al., "The NIST Definition of Cloud Computing", National Institute of Standards and Technology, Special Publication 800-145, Sep. 2011, pp. 1-7.

Wikipedia, "Amazon Dash," Wikipedia.org, 4 pgs., [accessed Jan. 17, 2022], Retrieved from the Internet: <https://en.wikipedia.org/wiki/Amazon_Dash>.

* cited by examiner

ROUTING PREFERENCE BASED COMMUNICATION TO A CLOSED GROUP HIERARCHY

BACKGROUND

The present invention relates to technology for directing or filtering incoming messages to facilitate matching of the messages and current consumer needs as sensed by smart devices such as IoT devices. The incoming messages may be directed to the correct destinations for decision making.

SUMMARY

According to one exemplary embodiment, a method for message directing is provided. A first computer receives a registration of members organized into a first closed group hierarchy. The first computer receives a notification of a sensed change of an element in an environment of the first closed group hierarchy. The first computer receives a first message from an external device. The first message relates to the changed element. The first computer selects a first member of the first closed group hierarchy for receipt of the first message. The selecting is based on message routing guidelines established for the first closed group hierarchy. In response to receiving the notification of the sensed change, the first computer transmits the first message to the selected first member of the first closed group hierarchy. A computer system and a computer program product corresponding to the above method are also disclosed herein.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
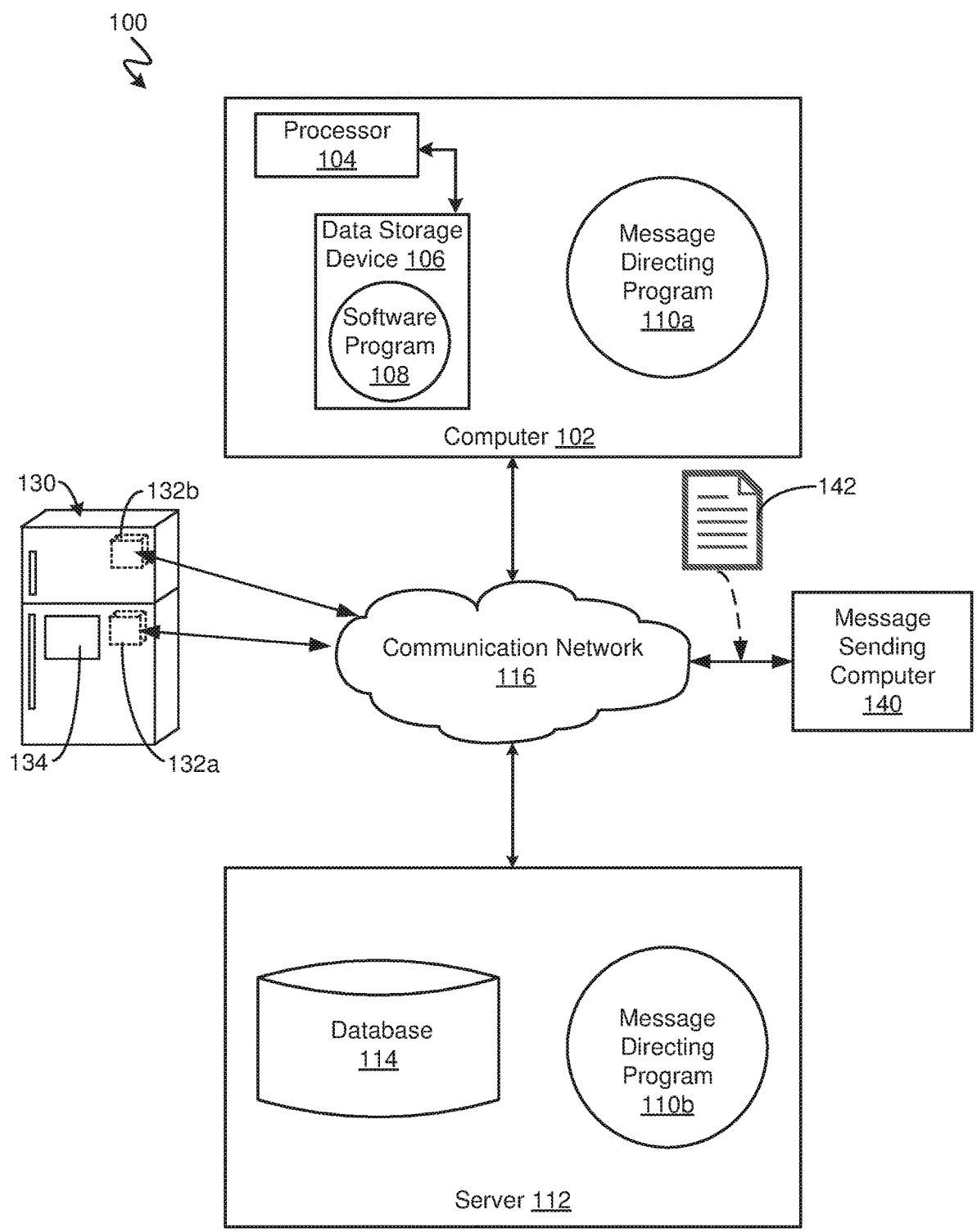
FIG. 1 illustrates a networked computer environment in which a message directing process according to at least one embodiment is implemented.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for directing messages that may help facilitate replenishment or repair of goods/supplies in response to sensors sensing a need for such replenishment or repair. In the current world, individuals are surrounded with smart devices for everyday household items such as smart refrigerators, smart cars, smart pantries, etc. These smart devices may use internet of things (IoT) technology which may include sensors, processors, software, and other technologies which allow the respective smart device to connect with and exchange data with other devices and systems via the internet or via other communication networks. The possible activity and engagement opportunities for an individual to monitor devices within their stewardship has surpassed what the individual may be able to handle in a daily limit of twenty-four hours. An individual who has a busy schedule may on various occasions miss taking care of small household things which are critical in day to day to life, such as purchasing grocery items to replenish household food, having worn brake pads on an automobile replaced, etc. Some items have a dynamic usage nature. Often an individual does not have a system in place for scheduled notifications about need to replenish, replace, or service items. Sometimes an individual may not remember to buy a replacement item until the item is completely gone in their household. Sometimes an individual may not remember to have an item repaired or replaced until the item is broken and causes operation of a larger device such as an automobile to fail or be unsafe. In such an instance, the need to buy a replacement or to pay for a repair becomes more urgent and the individual who makes this urgent purchase may be forced to settle for an undesirable choice and/or price due to the urgent need and unavailable replacements. An individual may miss out on sale prices for replacements because a reduced price for the sale may be removed by the time the individual is in need and seeks the replacement or the repair. The world today is fast paced. For an individual to receive up-to-date information on commodity levels, machine part deterioration, and other physical items within the stewardship of the individual is helpful.

The present embodiments seek to match relevant messages with parties who need to receive a particular message. The need is indicated by feedback from sensors from IoT devices. The present embodiments leverage IoT sensor information, machine learning on commodity replacement/repair, natural language processing of messages, and/or semi-automated establishment of message routing guidelines to improve message directing of digital messages. In the modern world, many machines and/or gadgets are smart with IoT technology and have ability to sense and indicate when a stored commodity becomes low in supply or when an item in use begins to deteriorate and/or require repairs. This information can be gathered and grouped together and may trigger the generation of an alert for an individual. Along with the alert, the individual may be prompted in an automated manner to update message routing guidelines and message reception preferences. The individual may also be provided with a relevant message, e.g., a promotional message preference for an offer related to a product and/or a service which the individual needs now or soon in the future. The present embodiments provide a system which can analyze given preferences, provided during initial system configuration, and past individual and/or household consumption choices, define message routing guidelines based on the analysis, and then route messages according to the routing guidelines and sensor information. The message routing guidelines may cause messages to be routed to appropriate decision makers such as a household member or a smart device who/which make purchasing decisions regarding replenishment/repair of an item. Thus, the present embodiments may improve the automated routing of digital messages to appropriate parties. The present embodiments may improve digital message guiding to achieve enhanced overlap of message sender and message recipient preferences including for defined consumption/maintenance categories. The present embodiments help integrate IoT information from household devices or warehouse devices to help enhance the digital message routing so that desired messages are received by a user at an appropriate time.

FIG. 1 illustrates a networked computer environment 100 in which a message directing process according to at least one embodiment is implemented. A refrigerator in many countries is part of all or most households. FIG. 1 shows that the networked computer environment 100 includes a smart refrigerator 130 with a first sensor 132a and a freezer sensor 132b. The first sensor 132a may be disposed within the refrigerator compartment of the smart refrigerator 130. The freezer sensor 132b may be disposed with a freezer compartment of the smart refrigerator 130. The first sensor 132a and the freezer sensor 132b may sense commodities being stored within the refrigerator and freezer, amounts of the commodities being stored, and changes of the amounts of the commodities being stored.

The first sensor 132a and the freezer sensor 132b may include one or more cameras, sonar transmitter/receivers, tactile sensors, scales, radio frequency identification (RFID) sensors, and other types of sensors to perform this observation and tracking of stored commodities within the various compartments of the smart refrigerator 130. A host computer of the smart refrigerator 130 may host a machine learning model which receives images, sonar data, RFID signals from items tagged with RFID sensors, and/or weights of commodities within the smart refrigerator 130 as input and which, in response, outputs a list of currently stored commodities, their amount levels, changes in their amount levels over time, and commodities which have recently become absent from the storage facility. The list may be presented via presentation devices of the smart refrigerator 130 such as via a speaker in an audio manner or via a refrigerator screen 134 in a visual manner (or any other manner which would communicate electronic information to the user). The refrigerator screen 134 may be disposed on or within the smart refrigerator 130. In the embodiment shown, the refrigerator screen 134 is disposed on an outer face of an exterior door of the refrigerator compartment of the smart refrigerator 130. In other embodiments, data regarding the above-mentioned lists may be transmitted to a computer, e.g., a smart phone, of a member of the household for presentation of the list. For refrigerator compartment areas designed to hold a specific object (e.g., eggs), a tactile sensor may be disposed within each egg-receiving opening which may sense the presence or absence of an object, e.g., an egg, within that opening. The tactile sensor may generate an electrical signal that is altered based on removal or addition of an item in a compartment. The tactile sensor may include a projecting level which projects into an individual space and is pressed when an object rests in an individual compartment and is released when such object is removed from the individual compartment. This lever may be connected to electrical wiring which generates an alteration of an electrical signal.

The machine learning model for tracking goods in the refrigerator may receive regular updates from the sensors, cameras, scales, RFID tracking units, etc. and may receive training enhancements (supervised training) by asking for user confirmation if the regular updates and commodity change determinations that are output based on the other data (images, sonar data, tactile data, RFID data, and/or weight information) being input into the machine learning model are accurate. A graphical user interface may be generated via software disposed in a processor of a computer of the smart refrigerator 130 and may be displayed on the refrigerator screen 134 and/or on a display of another computer in or associated with the household. A user may engage with the graphical user interface and confirm or correct the commodity tracking performed by the sensors of the smart refrigerator 130 and/or the output of the machine learning model in further supervised training of the machine learning model. The machine learning model for commodity tracking may be stored locally within data storage of a computer of the smart refrigerator 130 and/or within remote data storage of a remote computer, e.g., server 112, with which the smart refrigerator 130 may communicate via the communication network 116.

A commodity tracking program hosted locally within data storage of the smart refrigerator 130 and/or remotely with the cloud, e.g., within the server 112, may also include a pre-configured list of commodity threshold amounts which when crossed cause generation of a warning alert or cause generation of a request for a warning alert. The warning alert may indicate that the commodity may be completely consumed soon and should be replaced. A separate or the same machine learning model may be used to determine threshold levels for generating replacement/repair alerts or for requesting replacement/repair alert generation. This machine learning model may analyze commodity usage rates but also replacement frequency to determine an appropriate threshold amount for generating an alert for commodity replacement. The replacement frequency may take into account a frequency with which shopping trips are taken by a household and/or frequency with which goods, e.g., groceries, are received at the household after delivery via a grocery delivering service. This machine learning model may also receive training and updates by presenting threshold amounts, e.g., on the refrigerator screen 134 and/or on a screen of a household user such as on a screen of the computer 102, and asking via a graphical user interface for user confirmation of acceptance of a determined threshold amount which when crossed would trigger the generation of an alert signal for the user/hierarchy member.

For example, the sensor data may indicate when the milk in a container is ninety percent gone. This ninety percent amount may trigger the alert for consent updates and to open message reception for messages related to milk.

In some embodiments, sensor data may also provide information about needed commodity replacement based on commodity spoiling information. For example, images may indicate mold on one or more food items. An image-classifying machine learning model may sense the presence of mold and the need for a refrigerator item being stored to be discarded and replaced. In such instances, the alert signal may include a disposal recommendation for spoiled food as well as a replacement recommendation for buying a replacement food item.

The networked computer environment 100 may include a computer 102 with a processor 104 and a data storage device 106 that is enabled to run a software program 108 and a message directing program 110a. The computer 102 may be part of a closed group hierarchy of computers in a household or work area that will be further described in FIG. 2. The networked computer environment 100 may also include a server 112 that is a computer and that is enabled to run a message directing program 110b that may interact with a database 114 and a communication network 116. The server 112 may include a plurality of machine learning modules and/or may use the communication network 116 to access other servers which host machine learning models. The networked computer environment 100 may include a plurality of computers 102, smart devices with IoT technology, and servers 112, although one computer 102, one smart refrigerator 130, and one server 112 are shown in FIG. 1. The communication network 116 allowing communication between the computer 102, the smart refrigerator 130, and the server 112 may include various types of communication networks, such as the Internet, a wide area network (WAN), a local area network (LAN), a telecommunication network, a wireless network, a public switched telephone network (PTSN) and/or a satellite network.

It should be appreciated that FIG. 1 provides only an illustration of one implementation and does not imply any limitations with regard to the environments in which different embodiments may be implemented. Many modifications to the depicted environments may be made based on design and implementation requirements.

The hierarchy computer 102 may communicate with the server 112 via the communication network 116. Individual smart devices such as the smart refrigerator 130 within the networked computer environment 100 may also communicate with the hierarchy computer 102 and/or the server 112 via the communication network 116. The communication network 116 may include connections such as wire, wireless communication links, and/or fiber optic cables. As will be discussed with reference to FIG. 6, server 112 may include internal components 902a and external components 904a, respectively, and hierarchy computer 102 may include internal components 902b and external components 904b, respectively. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Hierarchy computer 102 may be, for example, a mobile device, a telephone, a personal digital assistant, a netbook, a laptop computer, a tablet computer, a desktop computer, or any type of computing device and/or computer capable of running a program, accessing a network, and accessing a database 114 in a server 112 that is remotely located with respect to the hierarchy computer 102. The hierarchy computer 102 may be mobile and may include a display screen and a camera. According to various implementations of the present embodiment, the message directing program 110a, 110b may interact with a database 114 that may be embedded in various storage devices, such as, but not limited to a computer/mobile device 102, a networked server 112, or a cloud storage service.

Although the networked computer environment 100 is shown with a smart refrigerator 130, the message directing program may be performed in other embodiments alternatively or additionally with other smart devices with IoT technology. Other smart devices such as a smart vacuum (with sensors for tracking the need to replace a vacuum bag), smart light (sensors tracking need for bulb replacement), smart liquid dispenser (such as a water cooler), smart soap dispenser, smart paper dispenser, e.g., for dispensing paper towels or toilet paper, smart pantry shelf, smart television, smart lawn equipment (for battery charging), smart automobile (for brake pad replacement, windshield wiper replacement, etc.), etc. may observe and track commodity levels/conditions and generate alerts when a commodity needs to be replaced, e.g., due to a decreasing amount and/or to a crossing of an amount threshold for a good. In the various embodiments, the machine learning models for tracking and/or threshold determination may be trained with respect to the relevant smart device (instead of with regard to the smart refrigerator 130). A message directing program that is part of a smart television may monitor television subscriptions of one or more digital services. As the subscription expiry date approaches, an alert may be generated and transmitted for alerting the user or household hierarchy member and for triggering the flow of related messages to the user/customer designated for decision making regarding subscription renewals.

The alert of the user/hierarchy member may trigger the flow of related messages to the user/customer/hierarchy computer 102 (within prescribed limits) that is designated for decision making regarding the respective commodity renewal/replacement/repair. The alert may also trigger a user interaction in which the user is asked to update preferences for receiving messages about the relevant commodity for renewal/replacement/repair.

Hierarchy members may provide consent to the message directing program 110a, 110b in order to have commodity data observed and tracked from the hierarchy stewardship (e.g., from within a household) and to have messages routed and/or directed based on the commodity tracking and/or on message routing guidelines established by and/or for the hierarchy members.

Figure 6:
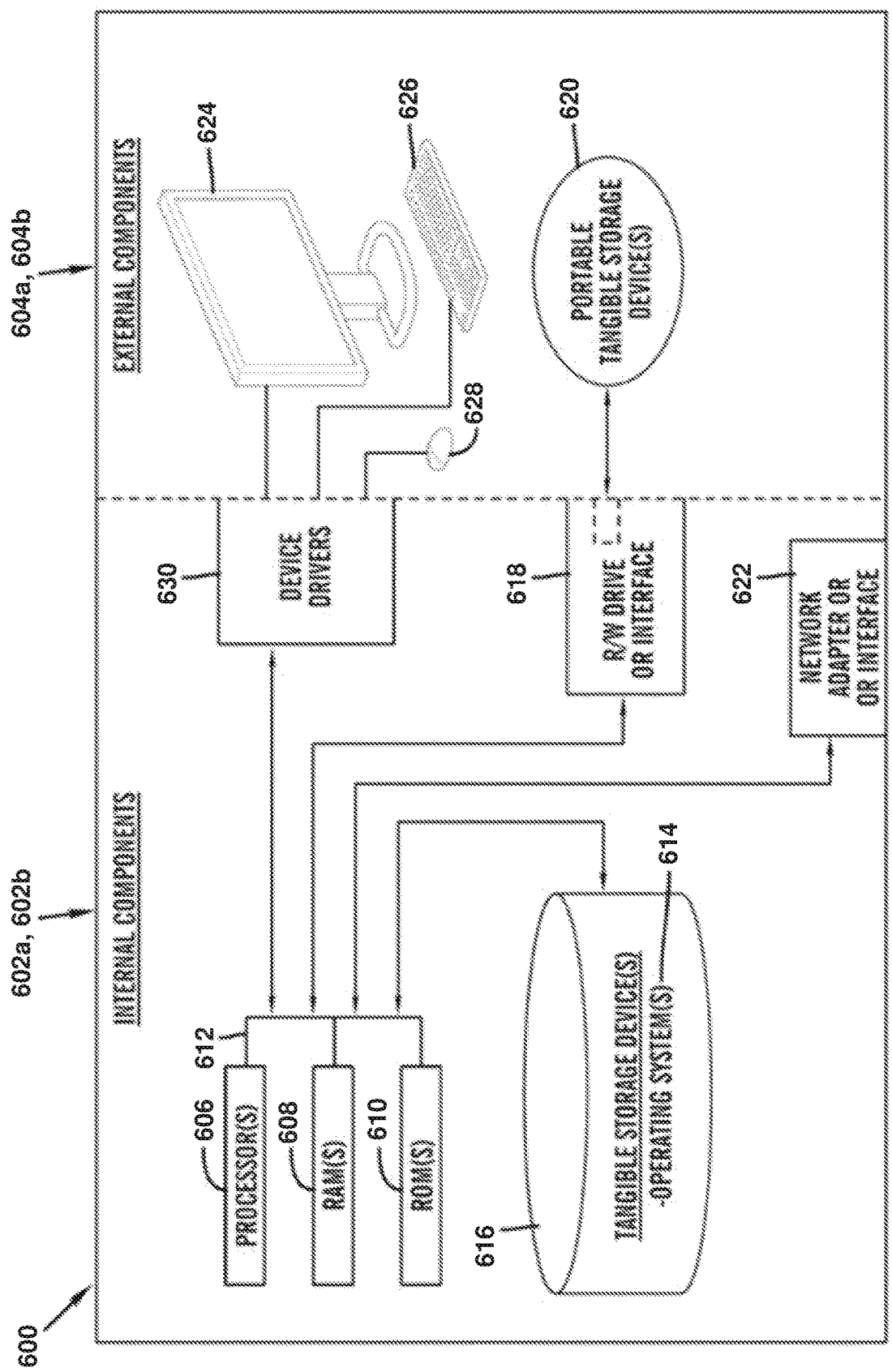
FIG. 6 is a block diagram of internal and external components of computers and a server depicted in FIG. 1 according to at least one embodiment.

As will be discussed with reference to FIG. 6, the server 112 may include internal components 902a and external components 904a, respectively. The computer 102 and interior computers of the various smart devices of the networked computer environment 100 may also each include internal components 902b and external components 904b as depicted in FIG. 6. Server 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The computer 102 may each be, for example, a mobile device, a telephone, a personal digital assistant, a netbook, a laptop computer, a tablet computer, a desktop computer, or any type of computing devices capable of running a program, accessing a network, and accessing a database 114 in a server 112 that is remotely located with respect to the computer 102. The computer 102 and computers of the smart devices may each include a display screen, a speaker, a microphone, a camera, and a keyboard or other input device for receiving output and providing input to the respective computer. According to various implementations of the present embodiment, the message directing program 110a, 110b may interact with a database 114 that may be embedded in various storage devices, such as, but not limited to a various computers/ mobile devices, a server 112 that may be in a network, or another cloud storage service.

FIG. 1 shows that that networked computer environment 100 may include a message sending computer 140 which may transmit a first message 142 intended for the computer 102 and for other computers not depicted. This first message 142 may in some embodiments be a promotional message. The message directing program 110a, 110b may receive and analyze an incoming message such as the first message 142. This analysis may include the performance of natural language processing on text content of the first message 142. This analysis may also include image analysis using a machine learning module trained to classify images. The message content analysis may help the message directing program 110a, 110b determine a purpose of the respective message such as the type of good, commodity, and/or service that is being promoted by the respective message. For audio messages, the message directing program 110a, 110b may perform speech-to-text conversion of the audio before performing natural language processing on the word contents of the message. The message sending computer 140 may constitute an external device with respect to the computer 102 and/or to the server 112.

Although a single message sending computer 140 is shown in FIG. 1, numerous computers may transmit various messages intended for receipt and viewing by one or more members of a closed group hierarchy such as a household. Numerous product marketers may submit messages intended for presentation to recipient consumers. Although the first message 142 is shown as a visual message, the first message 142 may in other be embodiments include or consist of audio aspects such as an audio recording. The first message 142 may also be an email, an SMS text message, a social media platform message, etc.

The message directing program 110a, 110b may intercept incoming messages related to commodity promotion and may forward them to hierarchy users within an appropriate time window as indicated by commodity tracking and/or according to hierarchy message routing guidelines established by and/or for the hierarchy. After a message is transmitted to a member of the hierarchy, the member may respond to the message. For example, the member may accept an offer provided in the message for sale of a commodity and/or a service. The member may actuate graphical user interface portions of the presented message in order to accept or decline the offer. In some embodiments, the member of the hierarchy that responds may be a hierarchy computer/device and/or a decision-making server.

FIG. 1 shows a smart refrigerator 130 as an example of a smart device with IoT technology. In other embodiments, the message directing process are implemented for a working group for a factory which manages a number of pieces of equipment. The factory may be a manufacturing facility which makes a workpiece such as a door handle, molding, or chrome plating for a car. The factory machines may have different times of needing to be serviced. The smart sensors may monitor the machines and machine component quality and deterioration to recognize and predict when an appropriate time will be for servicing and/or component repair/replacement. The message directing program 110a, 110b may forward messages at an appropriate time as indicated by the machine observation analysis. The workers may appreciate receiving relevant messages at an appropriate time related to care of the machines.

Figure 2:
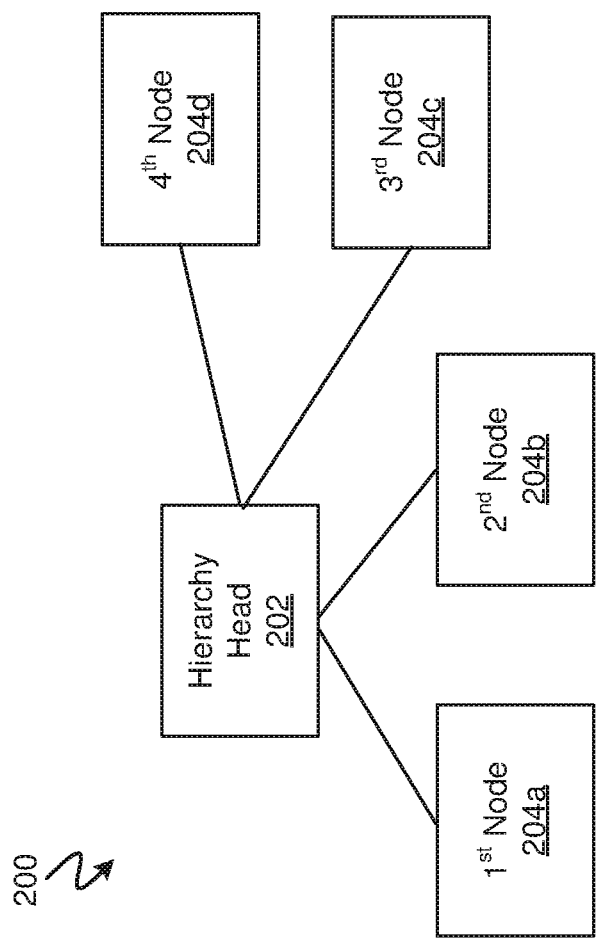
FIG. 2 illustrates a closed group hierarchy which is involved in a message directing process according to at least one embodiment.

FIG. 2 illustrates a closed group hierarchy 200 which is involved in a message directing process according to at least one embodiment. The closed group hierarchy 200 includes a hierarchy head 202 and multiple hierarchy nodes, for example a first node 204a, a second node 204b, a third node 204c, and a fourth node 204d. In the depicted embodiment, each of the nodes, namely the first, second, third, and fourth nodes 204a, 204b, 204c, and 204d, is directly connected to the hierarchy head 202. In other embodiments, the closed group hierarchy 200 may include multiple heads and multiple levels of nodes. In some embodiments, the hierarchy computer 102 shown in FIG. 1 may be a member/node of the closed group hierarchy 200, e.g., may be the hierarchy head 202, the first node 204a, the second node 204b, the third node 204c, or the fourth node 204c. In some embodiments, the end user device/computer 524 shown in FIG. 5 may be a member/node of the closed group hierarchy 200, e.g., may be the hierarchy head 202, the first node 204a, the second node 204b, the third node 204c, or the fourth node 204c.

Figure 3:
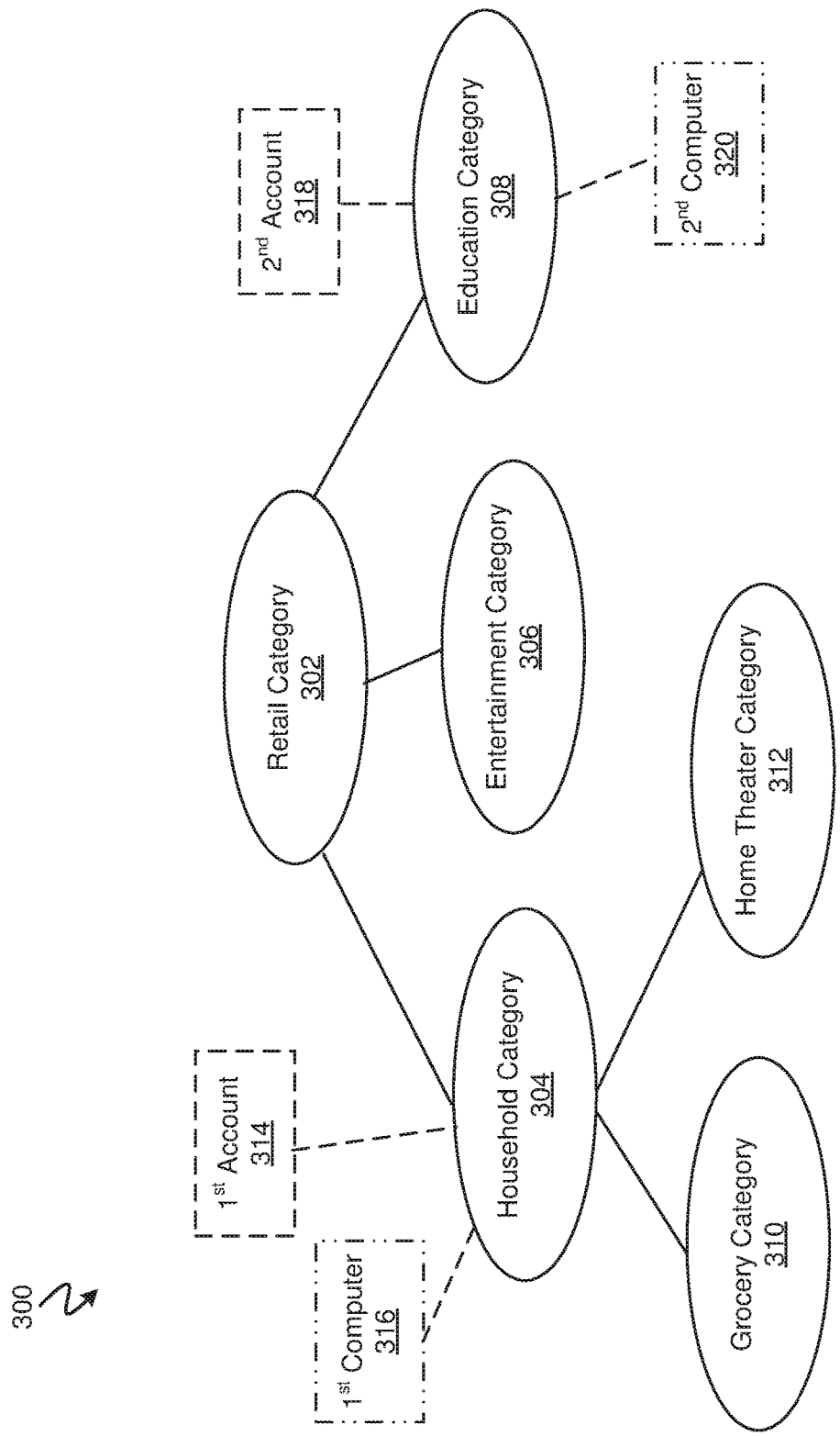
FIG. 3 illustrates a category hierarchy integrated with members of a closed group hierarchy according to at least one embodiment.

Message routing guidelines may be established for the routing of incoming messages to the closed group hierarchy 200 and its members. These guidelines may help direct messages to be directed to a decision-maker for a category instead of to a non-decision maker for the category. The smart IoT devices may trigger an incoming flow of messages related to certain needs sensed within the environment of the closed group hierarchy 200, and the message routing guidelines help direct an incoming message to an appropriate decision-maker of the closed group hierarchy 200 for that category. FIG. 3 discussed below provides more details about integration of categories and the closed group hierarchy 200.

In some embodiments, the closed group hierarchy 200 and its members, namely the hierarchy head 202 and the nodes, may represent respective computers, e.g., mobile devices, within a hierarchy such as a household and/or may represent respective registration accounts for a message directing program 110a, 110b. Thus, an individual who is a household head may be the hierarchy head 202 by using a personal cell device and/or by logging into a registration account at one of a variety of computers. Individuals who are part of a hierarchy, e.g., a household hierarchy or another group hierarchy, may be the respective nodes by using their personal respective cell devices and/or by logging into their respective registration accounts at one of a variety of computers. Thus, this embodiment designates nodes according to individuals, e.g., people, of the hierarchy based on computers/devices/accounts associated with those people.

In other embodiments, the first, second, third and fourth nodes 204a, 204b, 204c, 204d of the closed group hierarchy 200 may represent respective IoT smart devices which may make automated purchasing decisions for commodity replenishment/repair. The hierarchy head 202 may represent a computer associated with a primary buyer for a household. In an initial configuration and registration, the primary buyer may designate some replenishing/repair purchasing decisions to be automatically performed via the respective smart IoT device that is one of the first, second, third and fourth nodes 204a, 204b, 204c, 204d, in response to sensors of the respective smart IoT device sensing a need for repair/replenishment.

In other embodiments, the closed group hierarchy 200 and its members, namely the hierarchy head 202 and the first, second, third, and fourth nodes 204a, 204b, 204c, 204d, may represent a mixture of (A) computers corresponding to people with relevant purchasing responsibility and (B) smart IoT devices programmed for automated purchasing decisions.

The structure of the closed group hierarchy 200 may be established by user configuration upon registration with the message directing program 110a, 110b. The structure of the closed group hierarchy 200 may alternatively and/or additionally be established by the message directing program 110a, 110b evaluating purchasing decisions and/or purchasing history of members of a hierarchy and/or past usage of the commodities by hierarchy members. Upon consent being given in a registration by the users, the message directing program 110a, 110b may track and evaluate purchases made via computers of the hierarchy members. The purchases may be input into a machine learning model which may output a hierarchy structure. In some embodiments, a hierarchy member which handles a greatest amount or number of transactions may be designated as a or the head of the hierarchy.

The hierarchy head 202 or heads may be notified if the automated system received or generated conflicting message transmitting or commodity purchase information. For example, if the message directing program 110a, 110b which directs filtering/forwarding of the incoming messages inadvertently forwards offers for commodities of the same type to multiple hierarchy members and varying orders were placed, in response, by these hierarchy members, the message directing program 110a, 110b may recognize the conflict. The message directing program 110a, 110b may in response generate an order conflict notification to the hierarchy head 202 and transmit this notification. Via a generated graphical user interface of the message routing program 110a, the hierarchy head 202 may be presented with the conflict and may be provided with various options for resolving the conflict, e.g., by approving one order and vetoing another order or by approving multiple orders partially. The hierarchy head 202 may interact with the GUI to provide a response for resolving the conflict.

In some embodiments, if any product that is being sensed by a smart device, such as the smart refrigerator 130 shown in FIG. 1, is determined to be in a diminishing/deteriorating state, and which has an estimated cost greater than a pre-determined threshold, this sensing may generate an alert for the hierarchy head 202 in addition to an alert for a designated hierarchy member for this category. Thus, with this embodiment the hierarchy head 202 may be used to double-check if receiving messages related to expensive items is approved. For example, if sensors sense that a collection of expensive wines is dwindling, incoming messages about replacement of these expensive wines may be directed to the hierarchy head 202.

The closed group hierarchy 200 is closed because the hierarchy configuration and message routing guidelines are not accessible to and adjustable by an external party such as a message sender, e.g., a telemarketer. The hierarchy members such as the hierarchy head 202 and the message directing program 110a, 110b itself may adjust hierarchy configuration and message routing guidelines, but not an external party.

FIG. 3 illustrates a category hierarchy 300 integrated with members of a group hierarchy such as the closed group hierarchy 200 of FIG. 2 according to at least one embodiment. FIG. 3 shows that various categories are divided into levels. In this embodiment, a household category 304, an entertainment category 306, and an education category 308 are sub-categories to the retail category 302. In another category level, a grocery category 310 and a home theater category 312 are sub-categories to the household category 304.

FIG. 3 shows that various hierarchy members may be assigned purchasing responsibility for a particular purchase category. A 1st account 314 and a $1^{st}$ computer 316 may be part of a hierarchy such as a closed group hierarchy and may be assigned purchasing responsibility for the household category 304. Thus, at an appropriate time for message forwarding (based on analysis of commodity/consumption tracking performed via the message directing program 110a, 110b) the message directing program 110a, 110b may forward messages related to the household to the first account 314 and/or to the first computer 316 for presentation of the message. A 2nd account 318 and a 2nd computer 320 may be part of the same hierarchy such as the same closed group hierarchy and may be assigned purchasing responsibility for the education category 308. Thus, at an appropriate time for message forwarding (based on analysis of commodity/consumption tracking performed via the message directing program 110a, 110b) the message directing program 110a, 110b may forward messages related to education to the second account 318 and/or to the second computer 320 for presentation of the message. The relevant hierarchy member may watch and/or hear the presentation of the message and may provide a response to the message such as by accepting or declining an offer for a good and/or service related to the respective category.

In some embodiments, responsibility for a hierarchy member for a particular category may entail that hierarchy member being responsible for all sub-categories that are nodes of the higher category. For example, the Pt account 314 and/or the first computer 316 who are responsible for the household category 304 may also then be responsible for the grocery category 310 and the home theater category 312 which are node categories to the household category 304. This responsibility may include consenting to receive the relevant messages at the appropriate time as determined by the message directing program 110a, 110b which performs product/product storage observation and tracking. Thus, due to the designation of the $1^{st}$ computer 316 and/or the $1^{st}$ account 314 to the household category 304, the notifications from the refrigerator sensor 132a and the freezer sensor 132b of the smart refrigerator 130 shown in FIG. 1 may cause incoming messages related to the in-the-refrigerator stored dwindling commodities to be routed by the message directing program 110a, 110b to the $1^{st}$ computer 316 and/or the $1^{st}$ account 314 of the hierarchy instead of or in addition to other hierarchy members.

In some embodiments, a gaming category may exist and a household member which spends the most time gaming may be designated as a message recipient for gaming messages.

Figure 4:
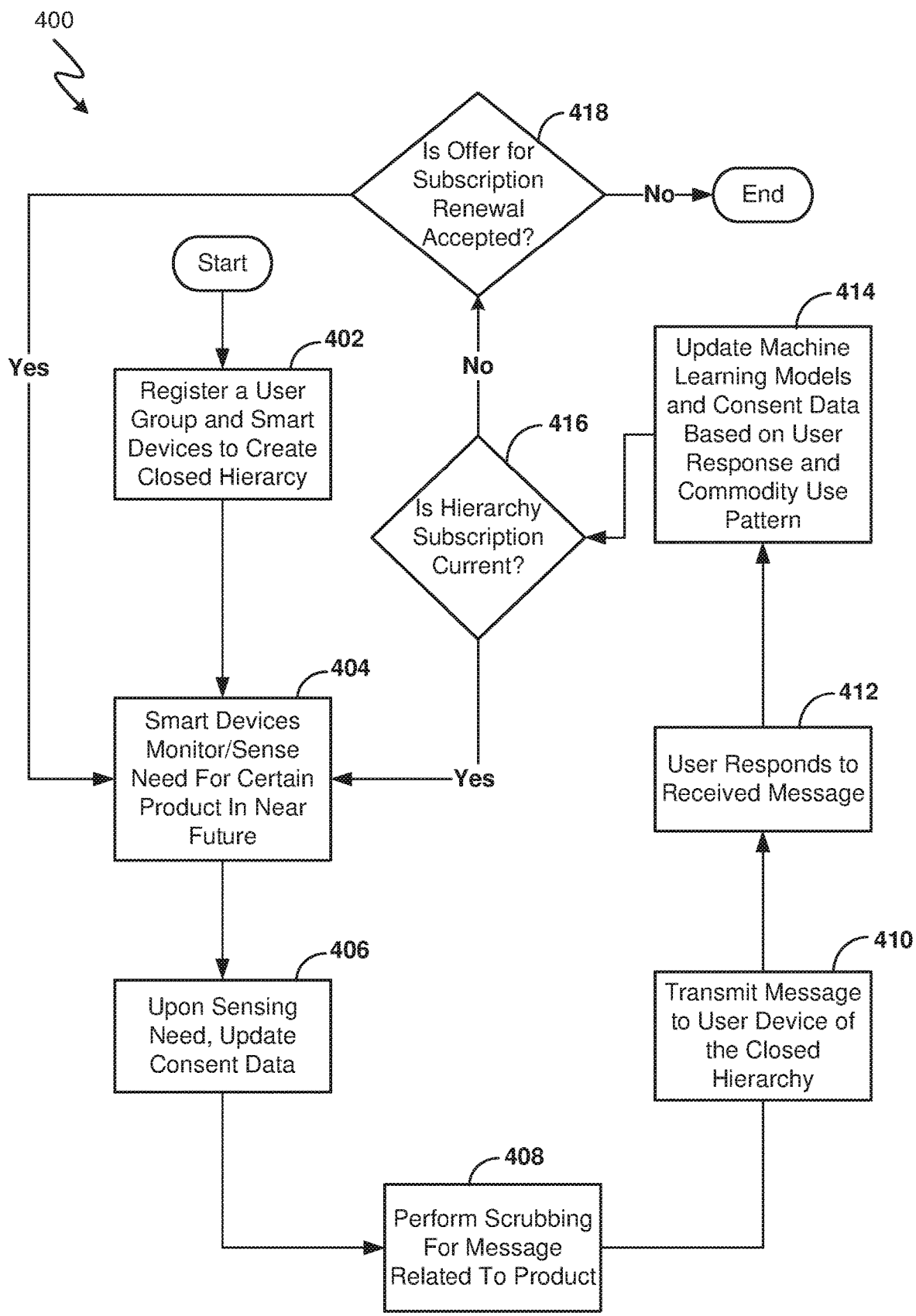
FIG. 4 illustrates a message directing process according to at least one embodiment.

Referring now to FIG. 4, an operational flowchart depicts a message directing process 400 that may, according to at least one embodiment, be performed using one or more of the computers and smart devices shown in FIG. 1. Various modules, user interfaces, services, and data storage may be used when the message directing process 400 is performed. Smart devices such as the smart refrigerator 130 shown in FIG. 1 may provide data which is used to perform the message directing process 400.

In a step 402 of the message directing process 400, a user group and smart devices are registered to create a closed group hierarchy. An individual using the hierarchy computer 102 may access a message-directing website and subscribe to the message directing program 110a, 110b. In response to activating the subscription, the message direction program 110a may be downloaded to the hierarchy computer 102. This user may select various other individuals to be registered as part of the closed group hierarchy. In some embodiments, the other individuals may be members of the same household or members of the same work team at a factory.

The registration may include obtaining message directing program login information for the other users. The registration may include providing contact information such as a mobile number and/or an email address to the message directing program 110a, 110b. The user may manually register a hierarchy structure with a member hierarchy as depicted in FIG. 2 and a category hierarchy 300 integrated with the member hierarchy as depicted in FIG. 3. Such manual initial configuration may be done by a user engaging a graphical user interface that is generated via the message directing program 110a at the hierarchy computer 102. This user registrant may manually designate category responsibility to particular users of the hierarchy. Additionally and/or alternatively the user registrant may agree to automated monitoring of user purchasing data which allows the message directing program 110a, 110b to generate a member hierarchy and a category hierarchy for the respective group based on the observed data and on machine learning model output. This registration data may generate or help generate message routing guidelines for the hierarchy. These message routing guidelines and consent for message receiving may be updated and/or revoked by hierarchy members at any time. Consent given for receiving messages for a certain commodity or from a certain commodity provider may be granted and then subsequently revoked by a hierarchy member.

Consents/permissions may be provided by a hierarchy head 202 and/or by each member of the closed group hierarchy 200. Consents for each smart device providing IoT data such as the smart refrigerator 130 shown in FIG. 1 may be provided by the hierarchy users during registration. The hierarchy members together or the hierarchy head 202 may tag and/or connect categories with the hierarchy members so that messages related to the various categories may be directed to the particular hierarchy member designated as a decision maker for that category. Consent data may be securely stored in a cloud database and in a distributed ledger such as a blockchain that is accessible to a telecom service provider.

For example, one hierarchy member may focus and make most grocery/food purchasing decisions for a household. Such hierarchy member may be designated as the decision-maker for the grocery/food category.

The registration may also include the hierarchy members selecting acceptable message providers and for designating other message providers as unacceptable. Thus, in embodiments with these entity-selecting features (who may send messages about a certain commodity) the users may exert greater specific control over selecting which principal entities may send them messages, e.g., promotional messages, and with respect to which categories.

In a step 404 of the message directing process 400, the smart devices monitor/sense a need for certain products or services in the near future. This monitoring and sensing of step 404 may be performed by various sensors of IoT devices such as the refrigerator sensor 132a and the freezer sensor 132b of the smart refrigerator 130 that is shown in FIG. 1. This monitoring may take place in an environment associated with the user group that was registered in step 402. The environment may be a household and/or a factory. In the embodiment shown in FIG. 1, the environment may include a household with the smart refrigerator 130. As was described before with respect to FIG. 1, this monitoring may be performed via one or more sensors such as cameras, sonar transmitter/receivers, tactile sensors, scales, and other types of sensors which sense data related to commodities in the environment or work tools being used. The sensor data may be input into a machine learning model which receives images, sonar data, electrical data, tactile date, and/or weights of commodities as input and which, in response, outputs evaluations and determinations of commodities/workpieces and their usage/deterioration over time. The sensor data may indicate a change in an element, e.g., a commodity, which is in or overlapping with an environment of the closed group hierarchy 200.

In a step 406 of the message directing process 400, consent data is updated based upon sensing the need in step 404. This updating of consent data may trigger the flow of one or messages that relate to the product or service that will soon be needed. This updating of consent data may occur via a data transmission via the communication network 116 from the message directing program 110a at the local computer to the message directing program 110b in the server 112 which may be in the cloud. This updating of data may alternatively occur via a data transmission via the communication network 116 from the respective smart device such as the smart refrigerator 130, which senses a change in commodity amount, to the message directing program 110b in the server 112 which may be in the cloud.

The database 114 in the server 112 and which communicates with the message directing program 110b may include a consent database for a registered user group and hierarchy. The database 114 may be part of a distributed ledger to which various intermediaries such as telecom service providers can contribute consent data for their customers. Such consent database may be regularly updated based on information received via transmissions that originate external to the server 112 and are received by the message directing program 110b at the server 112. Consent for the consent data indicates that the user now is interested in seeing one or more messages related to the particular product and approves of receiving such a message, whereas before the user was interested in having such product-related messages blocked or filtered, e.g., to a trash folder.

With this consent update, the message directing program 110b knows that a related message which is received within a subsequent time frame is now likely of interest to the user. Likewise, the message directing program 110b knows that any related message that arrived some time period before (e.g., within two days before) the consent update was given and is waiting in a blocked or filtered queue (data cache) is also likely of interest to the user. For goods that are replaced more frequently, this time window of queued messages before consent update that are deemed relevant for transmission may be shorter than for goods that are replaced less frequently. For goods with a higher replacement cost, this time window of queued messages before consent update that are deemed relevant for transmission may be longer than for goods that are less expensive to replace or repair. The consent data may be updated based on hierarchy-specific message routing guidelines that were established for this particular hierarchy, e.g., during the registration of step 402. The message routing guidelines may also include other message transmission constraints such as an acceptable number of messages per time period, e.g., per day, for a hierarchy member or hierarchy and a consent duration length for establishing a window in which the transmission of relevant messages is allowed and deemed accepted. In some embodiments, the triggering of step 404 may automatically update consents for relevant messages to be received. In some embodiments, the triggering of step 404 may generate a notification for an appropriate hierarchy member to ask for consent for consent update to receive relevant messages. Such notification may occur via a respective computer of the hierarchy and may allow a response such as an acceptance to be submitted via engagement with the computer, e.g., via engagement with a graphical user interface generated via the message directing program 110a at the computer 102.

As part of the consent updates for step 406, the hierarchy member may be asked via the message directing program 110a for which of multiple entities the consent data should be approved for receiving relevant messages from the entity. This question may be asked via a graphical user interface that is displayed at a screen of the computer 102.

In a step 408 of the message directing process 400, scrubbing for a message related to the product or service is performed. This step may be performed in embodiments where the message transmission occurs using a phone number of a computer such as a mobile device. This step may allow a message transmission to occur while maintaining anonymity of the user device and hierarchy which will receive the message. The scrubbing system components 500 shown in FIG. 5 which will be discussed subsequently may be used to carry out the scrubbing of step 408. A telemarketer may submit a list of potential customers for sending certain messages such as promotional messages. The scrubbing process returns virtual numbers to the telemarketer. A virtual number is a way for the telemarketer to reach a hierarchy user who has consented to receive the message/type of message or has been designated by smart devices for receiving the message/type of message, without the telemarketer knowing the actual number for this hierarchy member.

In a step 410 of the message directing process 400, the message is transmitted to a user device of the closed hierarchy. This message may be a message selected due to the consent updates in step 406 that is relevant to the need that was sensed in step 404. The user device may be a computer of the closed group hierarchy such as the hierarchy computer 102 shown in FIG. 1 which may be used by a member/participant of the closed group hierarchy. Thus, the transmission of step 410 may occur via the communication network 116 that is shown in FIG. 1. A hierarchy computer such as the computer 102 may present the message using audio-related structure such as a speaker and/or using visual-related structure such as a display screen. This computer 102 may be a mobile device such as a smart phone.

Step 410 may also include transmitting the message to the selected member/computer of the hierarchy instead of to a random member/computer of the hierarchy. The organization of the closed group hierarchy 200 and the category hierarchy 300 with which the closed group hierarchy 200 is integrated may allow the message transmitted to an appropriate member of the hierarchy who typically carries decision-making for a particular commodity or commodity type. Thus, the message directing program 110a, 110b helps improve timing of a message transmission/receipt and also helps identify amongst multiple possible recipients a best suited candidate for a particular message. As explained previously the various hierarchies may be established via initial user configuration upon registration or at a later time or via machine learning model output based on using hierarchy purchases data as input for the ML model.

Step 410 was described with respect to the transmission of a single message. In at least some embodiments, multiple messages may be transmitted as part of step 410. These messages may originate from different commodity providers and may share information with the relevant hierarchy member about the unique aspects of the commodity and commodity provision associated with the respective commodity provider. For example, if a smart refrigerator 130 sensed that milk was low and had crossed a 90% used threshold, messages from multiple milk providers, e.g., from multiple stores and/or dairies, may be transmitted to the hierarchy member who makes decisions about milk and/or groceries.

In a step 412 of the message directing process 400, the user responds to the received message. This message may be that message that was transmitted in step 412. In an example of the user response in at least some embodiments, the member may accept or decline an offer provided in the message for sale of a commodity and/or a service. The member may actuate graphical user interface portions of the presented message in order to accept or decline the offer. The message may also include a weblink which transfers a browser of the computer to a website which sells the respective commodity/service. By actuating the weblink, the browser may navigate to the website whereat the user accepts or declines the message offer.

An offer acceptance by the user may cause replacement goods to be ordered and received. An offer acceptance by the user may cause a service visit for work tool repair or replacement of a machine in a factory or for a machine of a household or other establishment. This acceptance may cause a delivery of a replacement item which the user may then place on the shelf which results in a replenishment of the particular commodity.

In a step 414 of the message directing process 400, machine learning models and consent data are updated based on the user response and on a commodity use pattern. These machine learning models may receive data output from sensors which sense a restocking/replenishment of goods being stored and/or which sense a repair of a work tool. This updated sensor data as compared to the earlier sensor data may help the machine learning model in future usage to better recognize a reduction and/or decline in a commodity. Machine learning models related to replacement thresholds may also be updated using frequency data and day and time when the replacement occurred. Updates for machine learning models may be presented to one or more hierarchy members via a respective registered computer for confirmation of the data, before being input for training of the respective machine learning model. The replenishment or repair of a commodity/tool may be recognized by sensors of the smart device so as to update the consent data and to reimplement message filtering and blocking, because replenishment and/or repair is no longer needed for this hierarchy at the current time with respect to this commodity. The smart device may then newly monitor/sense for renewed depletion/deterioration of this commodity or of another commodity. A stored/pre-determined commodity usage pattern may also trigger commodity sensing. For example, in this embodiment if a user purchases sugar then based on past sugar consumption no sugar sensing and/or receiving of sugar-related messages for the next time period, e.g., twenty-five days. After the twenty-five days, either or both of the sugar amount sensing and receipt of sugar-related messages may be initiated.

In some embodiments, consent updates that are received due to node members of a closed group hierarchy 200 updating their preferences may be submitted to the hierarchy head 202 before the consents are updated in the cloud database, e.g., in the distributed ledger. The hierarchy head 202 may be notified at their respective computer and may approve of the consent updates that were initially input via a node member of the closed group hierarchy 200, e.g., by the first node 204a.

In a step 416 of the message directing process 400, a determination is made as to whether a hierarchy subscription for this user group is current. If the determination of step 416 is affirmative and the hierarchy subscription for this user group is current, then the message directing process 400 proceeds to step 404 for a repeat of steps 404 to 414 with respect to newly sensed changes in the smart devices of this hierarchy. If the determination of step 416 is negative and the hierarchy subscription for this user group is not current, then the message directing process 400 proceeds to step 418. This determination of step 416 may occur via a data review of subscription data stored in the database 114 at the server 112. This database 114 may store data that is for and accessible by the message directing program 110b at the server 112.

In a step 418 of the message directing process 400, a determination is made as to whether an offer for subscription renewal is accepted. If the determination of step 418 is affirmative and the offer for subscription renewal is accepted, then the message directing process 400 proceeds to step 404 for a repeat of steps 404 to 414 with respect to newly sensed changes in the smart devices of this hierarchy. If the determination of step 418 is negative and the offer for hierarchy subscription renewal is not accepted, then the message directing process 400 may end.

Thus, in some embodiments the message directing process 400 may be continually repeated for a closed group hierarchy 200 so long as a subscription or registration for this closed group hierarchy 200 remains current with the message directing program 110b.

The message directing process 400 may also be repeated for other hierarchies that register or if the first hierarchy renews at a later time.

Any machine learning model that is used in the message directing process 400 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The machine learning model may be trained. The process of training a machine learning model may include providing training data to a learning algorithm or to a machine learning algorithm. The machine learning model is the model structure or system that is created by the training process. The training data should include targets or target attributes which include a correct answer. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 102 or at another computer associated with the server 112. The machine learning model that is generated may be stored on computer 102 or on the server 112 or on another external server accessible to the computer 102 and to the server 112 via the communication network 116. The message directing process 400 may be performed in part using one or more machine learning models on the local computer or in the cloud. Using a machine learning model on the smart device or user device helps reduce data transmission required between the devices and a server in the cloud. Such a mobile machine learning model may be performed using inference-based machine learning models such as TensorFlow® Lite (TensorFlow® and all TensorFlow®—based trademarks and logos are trademarks or registered trademarks of Google, Inc. and/or its affiliates).

The message directing program 110a, 110b benefits message recipients by blocking messages until the recipient has a peaked interest related to the message. The message directing program 110a, 110b benefits message senders by helping those message senders identify possible recipients which are likely to have a stronger interest in their message. In some embodiments, a telecom service provider may host consent data related to message routing for registered hierarchies. This hosting may allow the telecom service provider to better interact with message senders such as advertisers and promoters. The gathering of consent data and the registration may elicit commodity preferences from users which the telecom service provider may share with the commodity providers so that relevant messages may be routed.

It may be appreciated that FIG. 4 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

Figure 5:
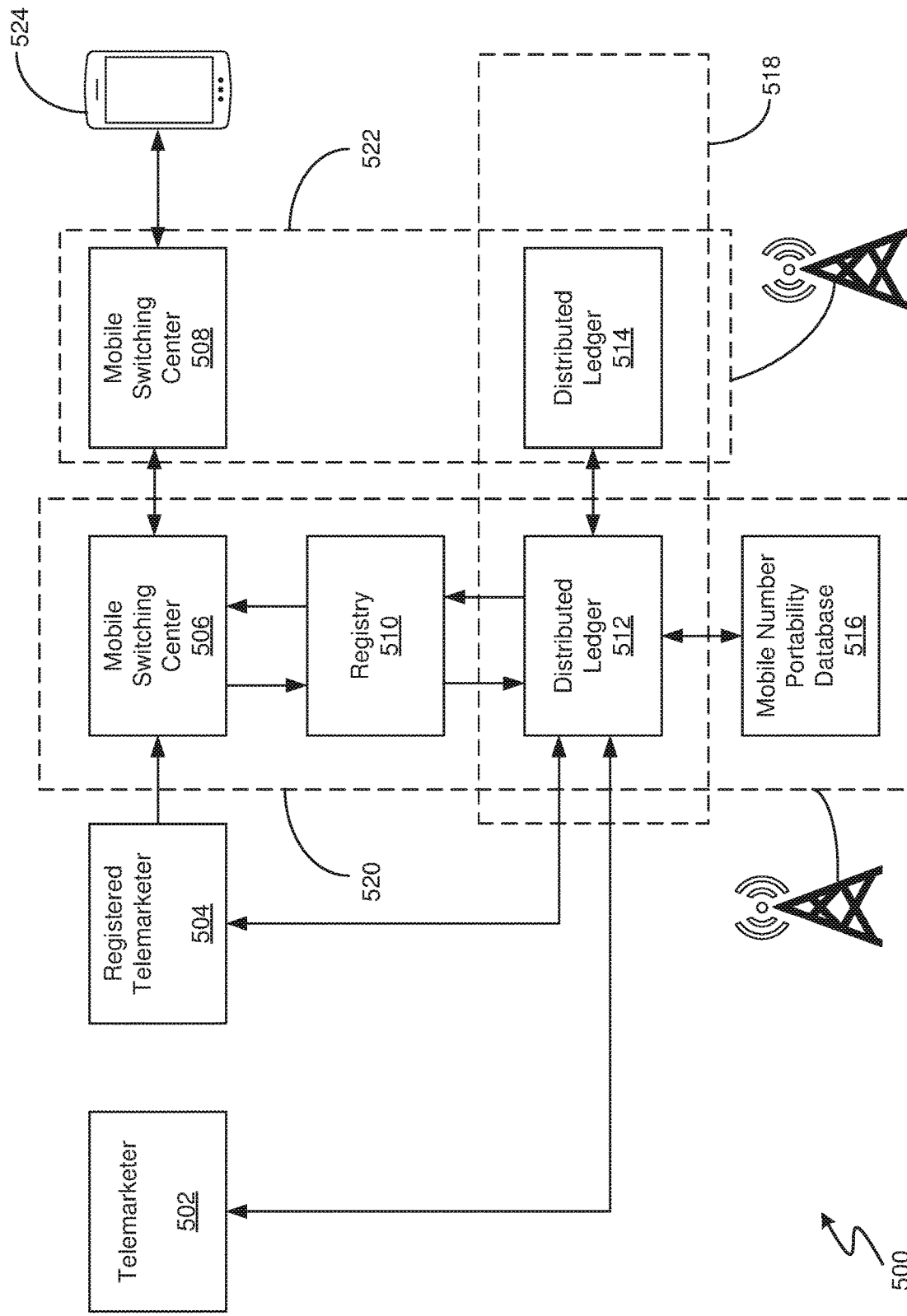
FIG. 5 illustrates system components used for an enhanced scrubbing process for a message directing process according to at least one embodiment.

FIG. 5 illustrates system scrubbing components 500 that are used for an enhanced scrubbing process for the message directing process 400 according to at least one embodiment. A principal entity, who wishes to send a message, shares a list of numbers with a telemarketer to send promotional messages for a certain category. The telemarketer submits the list to an originating access provider, e.g., a telecom service, who maintains the consent data on a distributed ledger maintained by telecom operators. The scrubbing process will return consent tokens for mobile numbers that have provided consent to receiving this type (category) of promotional message. A consent token may be a virtual 10-digit number. Additional smart device tokens may be generated by automatically checking the consent data that is updated by the smart (IoT) devices which hold commodities related to the respective message sending entity. A telemarketer can submit these virtual tokens along with the message to be sent to an originating access provider mobile switching center. This mobile switching center may retrieve the user mobile numbers from a distributed ledger and may then send the messages.

Thus, the system scrubbing components 500 may be invoked when smart IoT devices such as the smart refrigerator 130 shown in FIG. 1 sense a need for replenishment/repair of an item and notify the message directing program 110a, 110b. The message directing program 110a, 110b may store these updates as consents in the distributed ledger 518 discussed below. The message sending computer 140 which sends a message such as a promotional message or advertisement may be represented in the system scrubbing components 500 of FIG. 5 with the telemarketer 502 and/or the registered telemarketer 504 described below.

A telemarketer 502 and/or a registered telemarketer 504 may represent various entities which would like to send messages, e.g., SMS text messages, audio calls, social media platform text and/or audio messages, etc. to individuals. Each telemarketer may represent one or more entities such as a provider of a particular commodity. Different from the telemarketer 502, the registered telemarketer may register with an originating access provider 520 ("OAP") which may be a telecom provider. The registration may help simplify a transaction because identity verification steps may be reduced. The telemarketer 502 may register with the originating access provider 520 and particular with a distributed ledger 512 of the OAP to become a registered telemarketer 504. The telemarketer 502 and/or the registered telemarketer 502 may provide a proposed message to the OAP 520 which the telemarketer would like to send to end users who use the OAP or to another telecom service provider such as a terminating access provider 522 (TAP). The telemarketer 502 and/or the registered telemarketer 504 may also provide a list of potential customers to the OAP distributed ledger 512. The telemarketer 502 and/or the registered telemarketer 504 may upload a file via a communication network such as the communication network 116 shown in FIG. 1 with the potential customer list and/or a proposed message for review by the OAP distributed ledger 512. The respective telemarketer may have received the potential customer list based on previous contacts with the individuals or from another entity. The customer list may include device contact numbers of devices.

The OAP distributed ledger 512 analyzes those customer device numbers and determines whether these numbers belong to the OAP 520 and/or to another service provider such as the TAP 522. The OAP distributed ledger 512 may access mobile number portability database 516 to make this determination of which provider sponsors the respective user/potential customer. For example, for a potential customer list with a list of one hundred potential customers (customer numbers), the mobile number portability database 516 may return that sixty of the one hundred are sponsored via the OAP 520.

Then, based on this information the OAP distributed ledger 512 may check with the terminating access provider (TAP) distributed ledger 514 to inquire as to whether any of the remaining forty individuals on the list are sponsored by the TAP 522. This inquiry may indicate that half, e.g., twenty, of the remaining forty are sponsored via this TAP 522.

The distributed ledger 518 includes the OAP distributed ledger 512 and the TAP distributed ledger 514 and may include other distributed ledger segments from other telecom service providers. The OAP distributed ledger 512 may check with distributed ledger segments from other telecom service providers (e.g., that share the distributed ledger 518) to identify the sponsoring service providers for the remaining entries on the list of one hundred potential customers.

Upon determining a sponsorship of a particular number, the OAP distributed ledger 512 will check consent information (as was provided as explained in FIGS. 1-4) to determine whether this particular number is accepting messages of the specified type. The OAP distributed ledger 512 will also ask the TAP distributed ledger 514 if the customers sponsored by the terminating access provider 522 have given consent to receiving offers related to the desired message. The TAP distributed ledger 514 may check whether those forty numbers are serviced by the terminating access provider 522 and whether the users have given consent for this message/type of message. The check may include the user of an identifier of the entity wanting to send the message. The TAP distributed ledger 514 may use the identifier to check the consent data for the customers sponsored by the terminating access provider 522.

If the consents that have been granted by a user match the message, the TAP distributed ledger 514 may return a consent token and/or an additional smart device token to the respective telemarketer, e.g., the registered telemarketer 504, for that user. The consent token may be masked and anonymized by being a virtual number, e.g., a virtual ten-digit number, which does not match the actual device number but which may later be used by a party with the secret (that matches virtual number to actual number) to transmit messages to the actual device/computer.

If thirty of forty of the remaining customers were matches in the TAP distributed ledger 514 (so that ten of the forty were not matches), the thirty virtual tokens that are returned may be masked/anonymized with virtual numbers so that the telemarketer does not know who of the group of forty are the thirty who matched. This masking/scrubbing helps the telemarketers work through the registration/consent systems instead of having these message senders contact the end users directly.

The registered telemarketer 504 which is some embodiments may be an outbound dialer may check with the mobile switching center 506 of the originating access provider 520 and indicate an intent to share a message, e.g., make a call, to one of the end users sponsored by the originating access provider 520.

The OAP mobile switching center 506 may communicate with a registry 510 to determine whether a particular end user has asked not to be contacted via the entity. The registry 510 may take the virtual number and return the actual end user number to the mobile switching center 506. The registry 510 may contain a secret which it obtained from the OAP distributed ledger 512 in order to match virtual numbers with actual end user numbers. The registry 510 may include an inventory of actual end user numbers that were received from the OAP distributed ledger 512 and/or from the TAP distributed ledger 514. Thus, via the registry 510 the OAP mobile switching center 506 receives the correct customer contact number from the OAP distributed ledger 512. The OAP mobile switching center 506 and the registry 510 may together constitute a voice provider of the originating access provider 520.

The message may then be sent from the OAP mobile switching center 506 or from the TAP mobile switching center 508 using the actual number (e.g., the mobile station international directory number (MSISDN)) retrieved from the registry 510. This message may be sent to the end user computer 524 which may be a smart phone and without the registered telemarketer knowing the actual number of the end user computer 524. The registered telemarketer 504 may have a primary rate interface (PRI) with the end user computer 524 for sending the message, e.g., the phone call.

The scrubbing may in some embodiments also allow the identification of caller details for a promotional voice call. A telemarketer is usually an initiating party for a promotional call and may initiate such a call via an operator. The identity of organization for which the telemarketer is working may be hidden, because the party receiving the call sees a generic number associated with telemarketers but does see any entity-identifying information. Sometimes a telemarketer may use one number for representing multiple organizations at different times.

A subscriber may have a preference set stating what kind of communication is preferred. Many-to-many mapping may cause preference violations, however. A user may miss calls that the user would like to receive, because the user recognized the number as originating from a telemarketer without realizing what product is being promoted. The telemarketer may currently be promoting a product which a consumer is interested in learning about. In some embodiments the scrubbing may include generating and providing a content/intent name which is used during the call and displayed to the subscriber along with the telemarketer number. This content intent name gives an indication of the organization and the content type of the call to provide a subscriber with more information about the call. This helps eliminate chances of missing a call which would interest the end user. This helps a telemarketer to better communicate with parties who are willing to receive their call.

The message directing process 400 may derive a promotional category for a monitored commodity from a unique perspective. The message directing program/process also in a unique manner provides a user with options to select the promotional message category. The message directing program/process also achieves an automated selection the consent of the user for the promotional message of a brand.

The message directing program/process allows a user to provide permissions to different personal smart devices to update consent for certain categories. The user also tags different members to categories. The smart devices can monitor the current need for the individual and based on that update the consent data for appropriate category and principal entity on the distributed ledger. When Telemarketers submit the list of customers for sending certain promotional messages, a scrubbing process ensues which returns virtual numbers corresponding to customers who have given the consent and also additional entries for customers whose consent has been updated by the smart devices.

The message directing process 400 may facilitate a creation and usage of a hierarchy of closed group of subscriber hand used computers, e.g., smart phones, and automated digital elements to route messages as defined in user preferences to appropriate hierarchy members. The message directing process 400 may enable subscribers to define a unique group for members of their hierarchy and to define and control preference setup and routing for preferred product/service categories to hierarchy members. The message directing process 400 may enable subscribers to register and link a user group and automated digital elements for different categories/products so that messages related to these categories are sent to appropriate hierarchy members. The message directing process 400 may facilitate the creation of automated digital elements which have message routing decision capabilities based on the current preferences defined by the subscriber in the closed group. The message directing process 400 may include alerting hierarchy members via their subscriber user devices/computers based on control hierarchy setup and decision factors to the designated subscriber in the closed unit group.

The message directing process 400 may leverage a scrubbing service of a telecom service provider and preferences specified by users of the message directing program 110*a*, 110*b* to create a bounded environment in order to reduce manipulation by external parties of routing decisions for the closed group hierarchy. The message directing process 400 may facilitate the independent interpretation by the message directing program 110*a*, 110*b* of a received communication in light of product categories and the decision capability. A received message may be analyzed with natural language processing techniques and via message tag reading to determine to which category or categories a received message relates. The message directing process 400 may allow automated or semi-automated review and recommend message routing preferences and/or consent updates for the appropriate category and principal sending entities on a smart ledger based on monitoring feeds of IoT devices. The message directing process 400 may include implementing virtual numbers/tokens which would be used by a telecom operator to scrub against a preference list of a participant of the message directing program 110*a*, 110*b*.

The message directing process 400 may help achieve a safe and controlled message-receiving environment for users which is important in a confusing and fast-paced commercial world full of messages. The message directing process 400 helps messages that are prioritized for individuals to pass through filtering while other non-relevant messages are blocked or filtered to a trash folder without transmission to an individual end user device. This message routing enhancement ensures that the message satisfaction rate and, for promotional messages, offer acceptance rate are higher. Communications which are not interesting to an end user may be blocked out to relieve heavy message review burdens for that end user.

User/hierarchy members may in some embodiments configure the list of principal entities that are able to be provided consent for each category. A household member may be designated to decide on household articles/services, while another household member may be designated for telecommunication decisions for the household. One member of a factory team may be responsible for the lube of an equipment, while another member of a factory team may be responsible for transportation for equipment, supplies, and/or workers. Consumption and commodity change thresholds may be evaluated and/or determined and used to help trigger consent for messages to be received which relate to the diminishing commodity.

The system scrubbing components 500 may also help achieve a unique scrubbing to associate end user computers as virtual numbers/tokens or as additional entries which would be used by the telecom operator to scrub against a registry. Additional smart device tokens may be generated by automatically checking the consent data updated by the smart (IoT) devices related to this message-sending entity. The scrubbing may occur when telemarketers submit a list of customers for sending certain promotional messages. The scrubbing process may return virtual numbers corresponding to customers who have given the consent and additional entries for customers whose consent has been updated by the smart devices. If the smart refrigerator 130 detects that certain grocery items need to be ordered (as per a preconfigured rule or via a machine learning model output), the smart refrigerator 130 may notify the message routing program 110*b* and the distributed ledger 518 to update the message guidelines to activate message transmissions for messages related to these particular grocery items. Consent may be granted to a plurality of message senders, e.g., to three different message senders, who each have their own unique message to send related to these grocery items. The hierarchy member may also be notified via a notification at the computer 102. The scrubbing may provide greater protecting in the field of telecom service providers and telecom-related services such as phone calls, phone messages, and/or number-based social platform messages. The scrubbing may be applied when messages with cross-sellable advertisements are sent.

Additional smart device tokens are generated by automatically checking the consent data updated by the smart devices related to this principal message sending entity. The consent data may be checked when telemarketers submit the list of customers for sending certain promotional messages. The consent data may be checked via a scrubbing process for a registry.

FIG. 6 is a block diagram 600 of internal and external components of computers depicted in FIGS. 1-3 and 5 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 602a, 602b, 604a, 604b is representative of any electronic device capable of executing machine-readable program instructions. Data processing system 602a, 602b, 604a, 604b may be representative of a smart phone, a computer system, PDA, or other electronic devices. Examples of computing systems, environments, and/or configurations that may represented by data processing system 602a, 602b, 604a, 604b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer 102, the server 112, any smart (IoT) devices or other computers used, and any computers that are part of the scrubbing system components, e.g., for the mobile switching centers 506, 508, for the registry 510, for the distributed ledgers 512, 514, and for the end user device 524, may include respective sets of internal components 602a, 602b and/or external components 604a, 604b illustrated in FIG. 6. Each of the sets of internal components 602a, 602b includes one or more processors 606, one or more computer-readable RAMs 608 and one or more computer-readable ROMs 610 on one or more buses 612, and one or more operating systems 614 and one or more computer-readable tangible storage devices 616. The one or more operating systems 614, the software program 108 in the computer 102, the message directing program 110a in the computer 102, the message directing program 110b in server 112, and another instance of the program in other computer such as the end user device 524 may be stored on one or more computer-readable tangible storage devices 616 for execution by one or more processors 606 via one or more RAMs 608 (which typically include cache memory). In the embodiment illustrated in FIG. 6, each of the computer-readable tangible storage devices 616 is a magnetic disk storage device of an internal hard drive. Alternatively, each of the computer-readable tangible storage devices 616 is a semiconductor storage device such as ROM 610, EPROM, flash memory, or any other computer-readable tangible storage device that can store a computer program and digital information.

Each set of internal components 602a, 602b also includes a R/W drive or interface 618 to read from and write to one or more portable computer-readable tangible storage devices 620 such as a CD-ROM, DVD, memory stick, magnetic tape, magnetic disk, optical disk or semiconductor storage device. A software program, such as the software program 108 and the message directing program 110a, 110b can be stored on one or more of the respective portable computer-readable tangible storage devices 620, read via the respective RAY drive or interface 618 and loaded into the respective hard drive, e.g., the tangible storage device 616.

Each set of internal components 602a, 602b may also include network adapters (or switch port cards) or interfaces 622 such as a TCP/IP adapter cards, wireless wi-fi interface cards, or 3G, 4G, or 5G wireless interface cards or other wired or wireless communication links. The software program 108 and the message directing program 110a in the computer 102 and/or in one of the hierarchy user devices and the message directing program 110b in the server 112 can be downloaded from an external computer (e.g., server) via a network (for example, the Internet, a local area network or other, wide area network) and respective network adapters or interfaces 622. From the network adapters (or switch port adaptors) or interfaces 622, the software program 108 and the message directing program 110a in the computer 102 and the message directing program 110b in server 112 are loaded into the respective hard drive, e.g., the tangible storage device 616. The network may include copper wires, optical fibers, wireless transmission, routers, firewalls, switches, gateway computers and/or edge servers.

Each of the sets of external components 604a, 604b may include a computer display monitor 624, a keyboard 626, and a computer mouse 628. External components 604a, 604b can also include touch screens, virtual keyboards, touch pads, pointing devices, and other human interface devices. Each of the sets of internal components 602a, 602b also includes device drivers 630 to interface to computer display monitor 624, keyboard 626 and computer mouse 628. The device drivers 630, R/W drive or interface 618 and network adapter or interface 622 include hardware and software (stored in storage device 616 and/or ROM 610).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
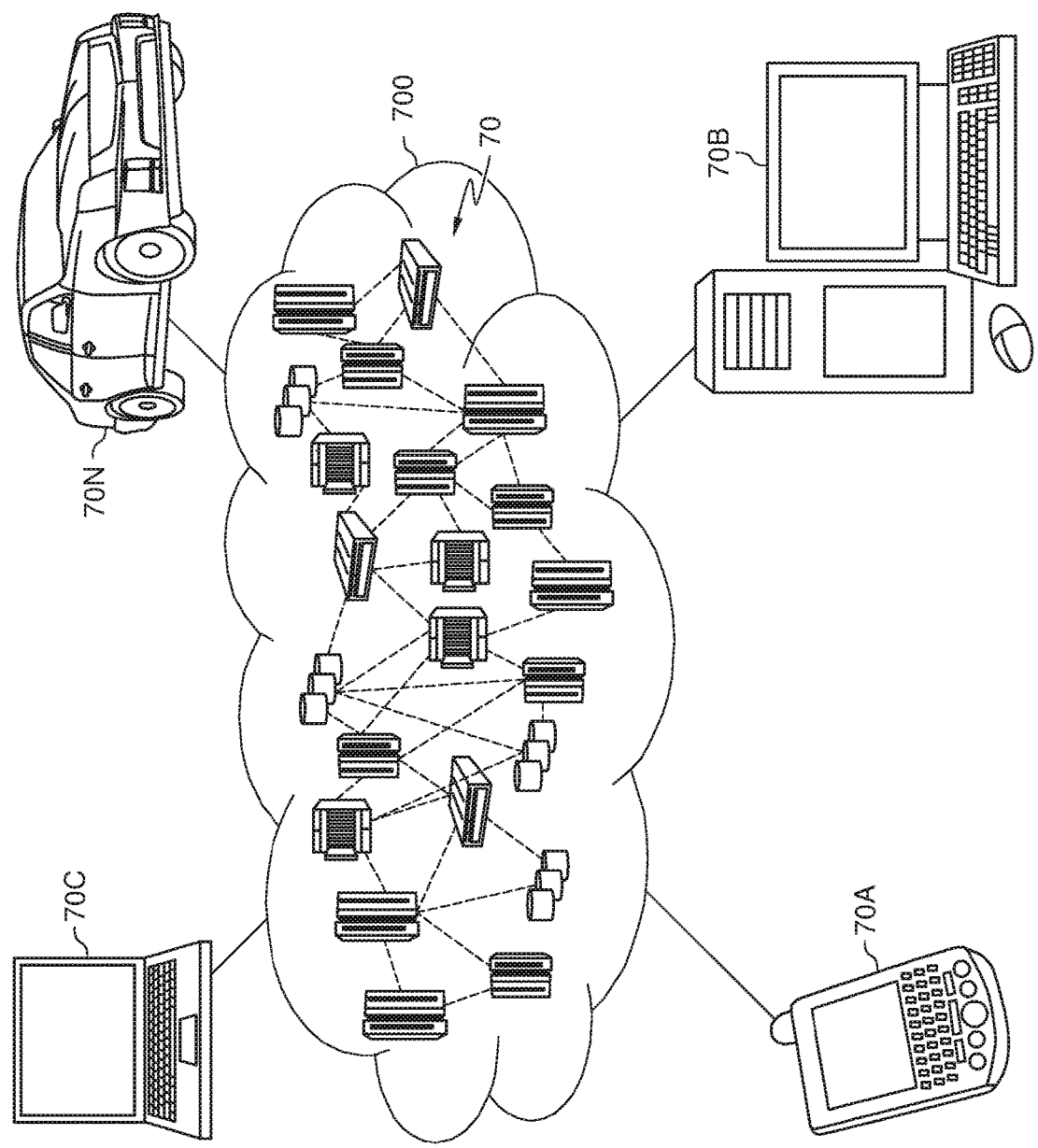
FIG. 7 is a block diagram of an illustrative cloud computing environment including the computer system depicted in FIG. 6, in accordance with an embodiment of the present disclosure.

Referring now to FIG. 7, illustrative cloud computing environment 700 is depicted. As shown, cloud computing environment 700 comprises one or more cloud computing nodes 70 with which local computing devices used by cloud consumers, such as, for example, personal digital assistant (PDA) or cellular telephone 70A, desktop computer 70B, laptop computer 70C, and/or automobile computer system 70N may communicate. Nodes 70 may communicate with one another and may include smart devices such as the refrigerator 330 shown in FIG. 4. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 70A-N shown in FIG. 7 are intended to be illustrative only and that computing nodes 70 and cloud computing environment 700 can communicate with any type of computerized device over any type of network and/or network addressable connection (e.g., using a web browser).

Figure 8:
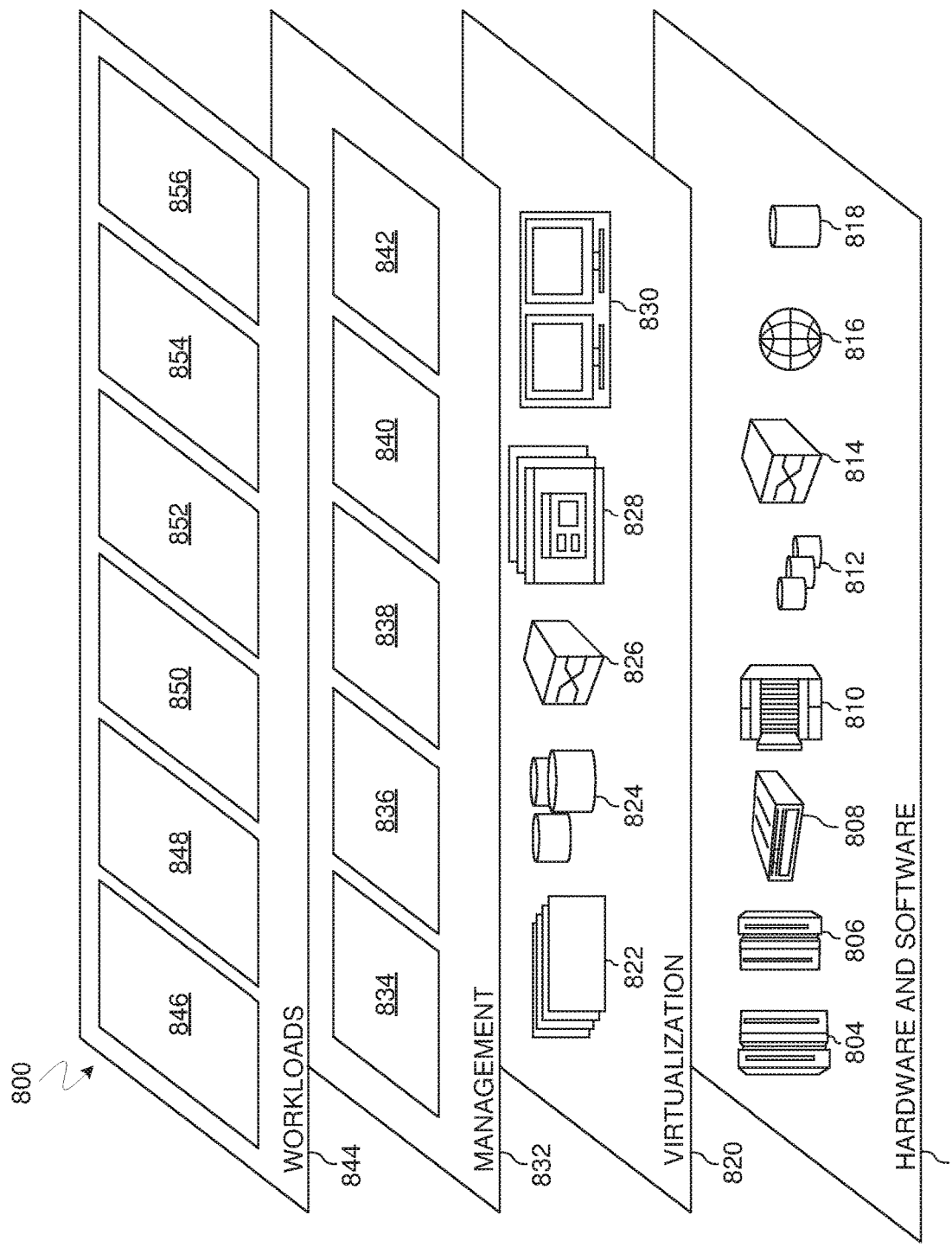
FIG. 8 is a block diagram of functional layers of the illustrative cloud computing environment of FIG. 7, in accordance with an embodiment of the present disclosure.

Referring now to FIG. 8, a set of functional abstraction layers 800 provided by cloud computing environment 700 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 802 includes hardware and software components. Examples of hardware components include: mainframes 804; RISC (Reduced Instruction Set Computer) architecture based servers 806; servers 808; blade servers 810; storage devices 812; and networks and networking components 814. In some embodiments, software components include network application server software 816 and database software 818.

Virtualization layer 820 provides an abstraction layer from which the following examples of virtual entities may be provided: virtual servers 822; virtual storage 824; virtual networks 826, including virtual private networks; virtual applications and operating systems 828; and virtual clients 830.

In one example, management layer 832 may provide the functions described below. Resource provisioning 834 provides dynamic procurement of computing resources and other resources that are utilized to perform tasks within the cloud computing environment. Metering and Pricing 836 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 838 provides access to the cloud computing environment for consumers and system administrators. Service level management 840 provides cloud computing resource allocation and management such that required service levels are met. Service Level Agreement (SLA) planning and fulfillment 842 provide pre-arrangement for, and procurement of, cloud computing resources for which a future requirement is anticipated in accordance with an SLA.

Workloads layer 844 provides examples of functionality for which the cloud computing environment may be utilized. Examples of workloads and functions which may be provided from this layer include: mapping and navigation 846; software development and lifecycle management 848; virtual classroom education delivery 850; data analytics processing 852; transaction processing 854; and message directing 856. A message directing program provides a way to send promotional messages for products at a time when a household is low on a particular item and to an appropriate user who may be a decision maker regarding the purchases for such items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for message directing, the method comprising:
    receiving, via a first computer, a registration of members organized into a first closed group hierarchy;
    receiving, via the first computer, a notification of a sensed change of an element in an environment of the first closed group hierarchy;
    receiving, via the first computer, a first message from an external device, wherein the first message relates to the changed element;
    selecting, via the first computer, a first member of the first closed group hierarchy for receipt of the first message, the selecting being based on message routing guidelines established for the first closed group hierarchy, wherein the message routing guidelines are implemented via a machine learning model in that the first message and past consumption choices of the first closed group hierarchy are input into the machine learning model and, in response, the selecting of the first member is output from the machine learning model; and
    in response to receiving the notification of the sensed change, transmitting, via the first computer, the first message to the selected first member of the first closed group hierarchy.

2. The method of claim 1, wherein the first member is a head device of the first closed group hierarchy and transmits the registration to the first computer.

3. The method of claim 1, wherein the first member is a node device of the first closed group hierarchy.

4. The method of claim 1, wherein the changed element is a commodity and the change is a reduction in the commodity.

5. The method of claim 4, wherein the notification of the sensed change occurs in response to the reduction being greater than a pre-determined threshold level.

6. The method of claim 1, wherein the changed element is a work tool and the change is a deterioration in the work tool.

7. The method according to claim 1, wherein the message routing guidelines comprise at least one user preference of at least one member of the closed group hierarchy.

8. The method according to claim 1, further comprising:
    scrubbing a contact number of the first member; and
    transmitting to the external device the scrubbed contact number so that the external device uses the scrubbed contact number to transmit the first message to the first member while maintaining anonymity of a primary number of the first member.

9. The method according to claim 8, wherein the scrubbed contact number is a ten digit number.

10. The method according to claim 1, further comprising transmitting consent data to a distributed ledger for storage of the consent data in the distributed ledger.

11. A computer system for message directing, the computer system comprising:
    one or more processors, one or more computer-readable memories, and program instructions stored on at least one of the one or more computer-readable memories for execution by at least one of the one or more processors to cause the computer system to:
    receive a registration of members organized into a first closed group hierarchy;
    receive a notification of a sensed change of an element in an environment of the first closed group hierarchy;
    receive a first message from an external device, wherein the first message relates to the changed element;
    select a first member of the first closed group hierarchy for receipt of the first message, the selecting being based on message routing guidelines established for the first closed group hierarchy;
    scrubbing a contact number of the first member;
    transmitting to the external device the scrubbed contact number; and
    in response to receiving the notification of the sensed change, transmit the first message to the selected first member of the first closed group hierarchy, wherein the external device uses the scrubbed contact number to transmit the first message to the first member while maintaining anonymity of a primary number of the first member.

12. The computer system according to claim 11, wherein the first member is a head device of the first closed group hierarchy and transmits the registration to the first computer.

13. The computer system according to claim 11, wherein the first member is a node device of the first closed group hierarchy.

14. The computer system according to claim 11, wherein the changed element is a commodity and the sensed change is a reduction in the commodity.

15. The computer system according to claim 14, wherein the notification of the sensed change occurs in response to the reduction being greater than a pre-determined threshold level.

16. The computer system according to claim 11, wherein the message routing guidelines are implemented via a machine learning model in that the first message and past consumption choices of the first closed group hierarchy are input into the machine learning model and, in response, the selecting of the first member is output from the machine learning model.

17. A computer program product for message directing, the computer program product comprising a computer-readable storage medium having program instructions embodied therewith, wherein the program instructions are executable by a computer system to cause the computer system to:
- receive a registration of members organized into a first closed group hierarchy;
- receive a notification of a sensed change of an element in an environment of the first closed group hierarchy;
- receive a first message from an external device, wherein the first message relates to the changed element;
- select a first member of the first closed group hierarchy for receipt of the first message, the selecting being based on message routing guidelines established for the first closed group hierarchy, wherein the message routing guidelines are implemented via a machine learning model in that the first message and past consumption choices of the first closed group hierarchy are input into the machine learning model and, in response, the selecting of the first member is output from the machine learning model; and
- in response to receiving the notification of the sensed change, transmit the first message to the selected first member of the first closed group hierarchy.

18. The computer program product according to claim 17, wherein the first member is a head device of the first closed group hierarchy and transmits the registration to the first computer.

19. The computer program product according to claim 17, wherein the first member is a node device of the first closed group hierarchy.

20. The computer system according to claim 11, wherein the scrubbed contact number is a ten digit number.

* * * * *